Jan. 11, 1944.    C. L. DUNN ET AL    2,339,160
DISTILLATION PROCESS
Filed Aug. 2, 1940    2 Sheets-Sheet 1
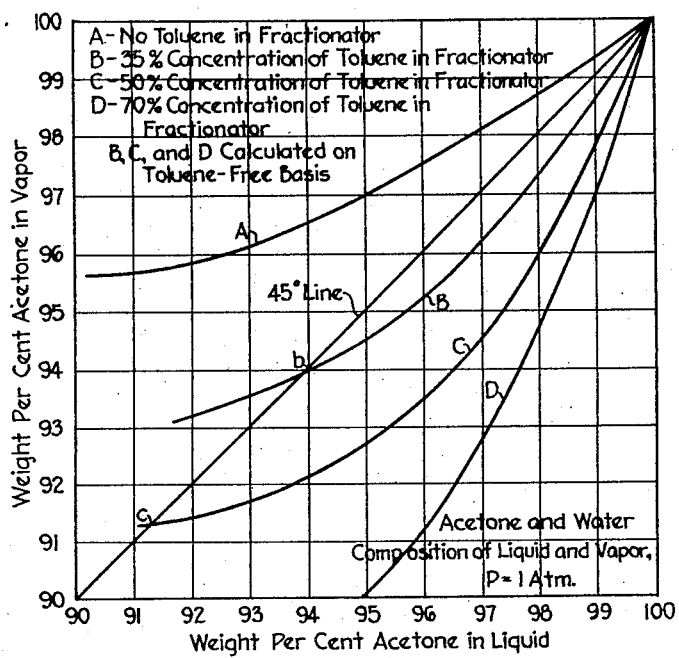
Fig. I
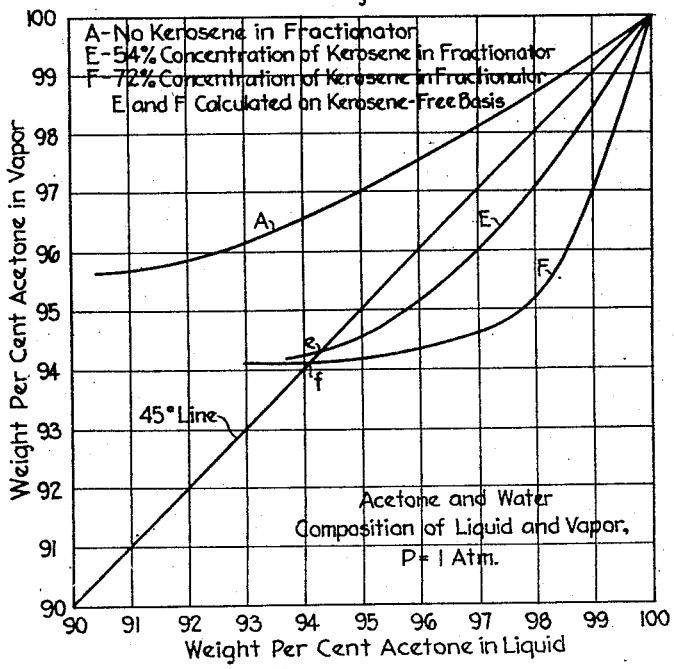
Fig. II
Inventors: Clarence L. Dunn
Gino Pierotti
By their Attorney:

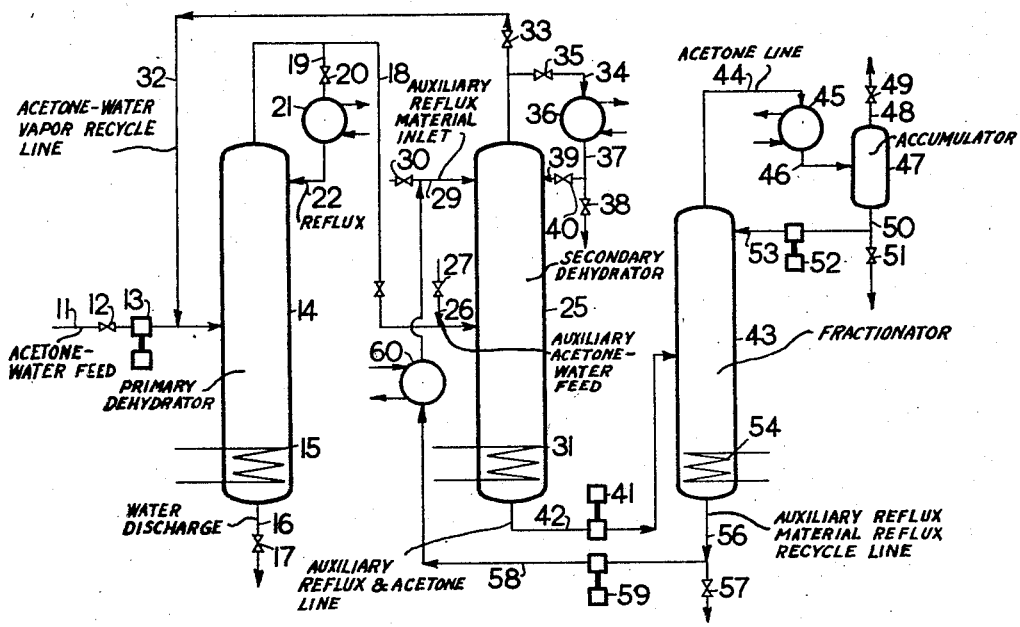
Fig. III
Fig. IV

Patented Jan. 11, 1944

2,339,160

UNITED STATES PATENT OFFICE 2,339,160

DISTILLATION PROCESS

Clarence L. Dunn and Gino Pierotti, Berkeley, Calif., assignors to Shell Development Company, San Francisco, Calif., a corporation of Delaware Application August 2, 1940, Serial No. 349,758

10 Claims. (Cl. 202—67)

This invention relates to an improved distillation process for the separation of solutions or liquid mixtures of substances the complete separation of which is extremely difficult by ordinary fractionation methods. The invention relates more particularly to an improved distillation process for the substantially complete separation of water from admixture with oxygen-containing, normally liquid, organic substances.

The substantially complete separation by fractionation of one or more components from mixtures of liquid substances or solutions, even though the component or components to be separated do not form azeotropes with other components of the mixture or solution, is often so difficult as to make operation on a commercial scale uneconomical if not impossible. Thus the substantially complete separation of water from water-containing acetone, by distillation methods as disclosed heretofore, to obtain a product with a water content below, for example, about 0.5%, is difficult and economically unattractive. A high column of large diameter is generally required and the fuel and cooling water consumption is excessively high since the product must be distilled overhead at high reflux.

Methods have been disclosed heretofore wherein separation of a component from mixtures of liquid substances is effected in the presence of an added material, termed a "withdrawing agent." The purpose of the withdrawing agent in these processes is to form an azeotrope comprising the withdrawing agent and the component to be separated. Although facilitating to some extent the separation of components normally separated with great difficulty, such processes as disclosed heretofore, are exceedingly uneconomical in that the withdrawing agent must be taken overhead as a vapor with the product to be eliminated from the mixture, thus requiring the expenditure of substantial additional amounts of fuel and cooling water. Such processes furthermore generally need elaborate condensing and separating equipment thereby departing from the simplicity of operation which is an essential of an economically desirable commercial process.

It is an object of the present invention to provide a novel and efficient process for the separation of at least one component from mixtures of liquid substances or solutions, the substantially complete separation of which by fractionation processes disclosed heretofore is extremely difficult, costly, and often impossible.

Another object of the invention is the provision of a novel, efficient distillation process for the separation of at least one component from a solution or mixture of liquid substances from which the component or components are normally separated with difficulty, in which novel process the separation is brought about with expenditure of substantially less fuel and cooling water than is required for a similar separation by processes disclosed heretofore.

Still another object of the invention is the provision of a novel, efficient and economical distillation process for the substantially complete separation of water from admixture with acetone, whereby anhydrous acetone is obtained with far less expenditure of fuel and cooling agents than is required for the production of this product in its anhydrous state by processes as disclosed heretofore. A still further object of the invention is the provision of a novel, efficient and economical distillation process for the substantially complete separation of water from its admixture with dioxane. Other objects of the invention will become apparent from the following description thereof.

In accordance with the invention the separation into its components of a binary mixture of liquid substances, which separation is impossible or can be carried out only with difficulty by distillation processes as disclosed heretofore, can be effected easily and with great savings in cost by fractionally distilling the mixture while maintaining throughout the distillation zone an added material the presence of which will increase the content of the component to be separated as a vapor in the equilibrium vapor. The added material is selected from liquid materials having greater solubility for one of the components than for the other, having higher boiling points than the component for which they have the greater solubility, and which will not form binary azeotropes with the component for which they have the greater solubility nor ternary azeotropes with both components. Although the process of the invention is applicable to the separation of components from a great number of solutions and mixtures of liquid substances, in order to make the invention more readily understood it will be described herein in its application to the separation of substantially all of the last traces of water from an oxygen-containing organic liquid such as, for example, acetone, without, however, being limited in its application to this illustrative example.

Reference will now be made to the attached drawings forming part of this specification and in which Fig. I represents composition curves showing the per cent by weight of acetone in the equilibrium vapors and in the liquid in contact therewith when distilling a mixture of acetone and water in the absence of, and in the presence of toluene.

Fig. II represents composition curves showing the per cent by weight of acetone in the equilibrium vapors and in the liquid in contact therewith when distilling a mixture of acetone and water in the absence of, and in the presence of a hydrocarbon fraction boiling in the kerosene boiling range.

Fig. III represents one form of apparatus suitable for carrying out the process of the invention, and Fig. IV represents a vapor composition curve for a mixture of acetone and kerosene.

In the fractional distillation of aqueous acetone, the ratio of water to acetone in the equilibrium vapor is less than the ratio of water to acetone in the liquid throughout the range of composition. It has been found that in distilling an acetone-water mixture, the presence in controlled amounts throughout the fractionating zone of a suitable added material reverses this relationship over the range of high acetone composition, so that over this range of composition the ratio of water to acetone in the equilibrium vapor is higher than the ratio of water to acetone in the liquid. Thus the presence of over 35% of a hydrocarbon such as, for example, benzene, toluene, or a substantially paraffinic hydrocarbon mixture having a boiling range above about 65° C., preferably above 100° C., such as a kerosene fraction, etc., is found to affect the liquid-vapor relationships of water and acetone so that for an acetone-water mixture containing above about 95% acetone, the equilibrium vapors will have a higher water content than the liquid in equilibrium therewith on an acetone-water basis. Such suitable added materials have been termed "auxiliary reflux" throughout the specification and claims.

The effect of the presence of the auxiliary reflux throughout the distillation zone is well illustrated by Figs. I and II of the drawings based upon data obtained by distilling acetone-water mixture in the absence of, and in the presence of varying amounts of hydrocarbon auxiliary reflux at atmospheric pressure. Curve A is an enlarged plot of the upper portion of the liquid-vapor equilibrium curve for an acetone-water mixture showing the weight per cent of acetone in the equilibrium vapor and in the liquid in contact therewith. It is seen therefrom that the ratio of acetone to water in the vapor is greater than in the liquid in contact therewith. It is immediately apparent that substantially complete separation of water from acetone on a commercial scale by ordinary distillation processes as known heretofore presents serious technical and economical difficulties. Curves B, C, and D in Fig. I show the enlarged upper portion of the liquid-vapor equilibrium curves for acetone-water mixtures when effecting the distillation in the presence of toluene as auxiliary reflux supplied at such a rate as to maintain approximately 35%, 50% and 70% by weight respectively of toluene throughout the fractionating zone. The curves show the percent by weight of acetone in the equilibrium vapor and in the liquid in contact therewith on a toluene-free basis. Similarly, curves E and F of Fig. II show the enlarged upper portion of the liquid-vapor equilibrium curves for acetone-water mixtures when effecting the distillation in the presence of 54% and 72% by weight respectively of kerosene throughout the distillation zone. The kerosene used had a distillation range of from 115 to 145° C. at 60 mm. It is apparent from Figs. I and II that the presence of the hydrocarbon in increased amounts throughout the fractionating zone substantially increases the water content of the equilibrium vapors on a hydrocarbon-free basis. In the following table the per cent by weight of water in the equilibrium vapor in contact with a solid acetone-water mixture containing 5 per cent by weight of water is shown in the absence of, and in the presence of varying amounts of the hydrocarbon auxiliary reflux throughout the fractionating zone. The figures are given on a hydrocarbon-free basis.

Per cent by weight of water on hydrocarbon-free basis

In liquid_____ 5
In vapor
  No hydrocarbon present_____ 2.9
  35% toluene present_____ 5.4
  50% toluene present_____ 7.3
  70% toluene present_____ 9.92
  54% kerosene present_____ 5.4
  72% kerosene present_____ 5.8

It is further to be noted that in the presence of the hydrocarbon auxiliary reflux the equilibrium curve based on hydrocarbon-free basis, crosses the 45° line. In column A of the following table the water content of the vapor and liquid on a hydrocarbon-free basis are given in per cent by weight for the points $b$, $c$, $e$, and $f$ at which points curves B, C, E and F cross the 45° line respectively. Figures in column B show the water content of the vapor in equilibrium with liquid acetone and water for the same ratio of acetone to water, when distilling in the absence of the hydrocarbon auxiliary reflux. The point at which curve D crosses the 45° line falls to the left of the section of the curve shown in Fig. I and is therefore not given here.

| Point on curve | A | B |
|---|---|---|
| $b$. (35% toluene) | 6.1 | 3.4 |
| $c$. (50% toluene) | 8.7 | 4.3 |
| $e$. (54% kerosene) | 5.7 | 3.3 |
| $f$. (72% kerosene) | 5.9 | 3.4 |

It would therefore seem that the effect of the presence of the auxiliary reflux is the production of an apparent azeotrope between acetone and water although their binary mixture does not form an azeotrope under ordinary conditions. It will be seen that when an acetone-water mixture having a water content below that of the liquid water-acetone mixture defined by the point at which the equilibrium curve crosses the 45° line, is distilled with maintenance of an adequate amount of hydrocarbon auxiliary reflux throughout the distillation zone, the water content of the vapor will exceed that of the liquid in equilibrium therewith. The ratio of the water content of the vapor to that of the liquid in equilibrium therewith will increase progressively the further one proceeds upward (to the right) along the curve from the point at which the equilibrium curve crosses the 45° line. It is thus apparent that by the use of controlled quantities of a suitable hydrocarbon auxiliary reflux in the distillation of an acetone-water mixture having a low water content, a water-rich overhead can easily be obtained thus permitting the effective and economical separation of the last traces of water from water-containing acetone to a degree not attainable heretofore in so economical an operation.

In applying this discovery to the dehydration of acetone in the process of the invention, the acetone-water mixture is dehydrated in a first dehydrating step to a water content below, for example, about 5% and preferably below about 1% by weight by a distillation effected in the absence of auxiliary reflux. The partially dehydrated acetone is then substantially completely dehydrated by distillation in the presence of a suitable auxiliary reflux such as, for example, kerosene or toluene, maintained in controlled amount throughout the distillation zone. The extent to which the first dehydration step is carried out will depend upon the nature of the auxiliary reflux used in the second dehydrating zone and the concentration of the auxiliary reflux maintained in the second dehydrating zone. The first dehydration step is, however, continued to such a degree that the water content of the partially dehydrated acetone obtained therefrom will be less than the water content of the liquid acetone-water mixture defined by the point at which the vapor equilibrium curve, on a hydrocarbon-free basis, for the distillation in the second dehydrating zone crosses the 45° line. This point is, as shown above, determined by the nature of the auxiliary reflux and its concentration throughout the second dehydrating zone.

It is to be pointed out that the process of the invention is not to be confused with the removal of water in its binary azeotrope with the added material, for the binary azeotropes of all the materials named boil at temperatures higher than the boiling point of acetone. Nor can the effect be due to the removal of the water in its ternary azeotrope with acetone and the added material, for the stillhead temperature in all cases is well above the boiling point of the most volatile component. It is further to be noted that the effect of the auxiliary reflux cannot be due to the lowering of the partial pressures of acetone and water since this pair are known to be easier to separate at reduced pressure and to form an azeotrope containing 7.5% water at 150 lbs. pressure.

Although a kerosene fraction and toluene have been chosen as examples of suitable auxiliary reflux in the above illustrative description of the invention, the invention is by no means limited to the use of these materials in the dehydration of water-containing acetone, and one or more materials from a wide group of materials can be used comprising for example, aromatic hydrocarbons such as benzene and xylene, hydrocarbon mixtures consisting substantially of these aromatic hydrocarbons, ethyl tertiary amyl ether, saturated ketones having seven carbon atoms to the molecule, tertiary octyl alcohol, secondary amyl acetate, chlorobenzene, isodecane, substantially saturated aliphatic hydrocarbons having a boiling range above about 65° C., preferably above 100° C. Essential requirements of a suitable auxiliary reflux are that it have better solvent properties for acetone than for water, that it boil at a higher temperature than acetone, and that it does not form binary azeotropes with acetone nor ternary azeotropes with acetone and water.

Fig. III represents one form of apparatus applying the above novel distillation method suitable for the production of substantially completely anhydrous acetone with a minimum expenditure of fuel and cooling water.

An oxygen-containing organic liquid, such as, for example, acetone, containing water in excess of, for example, about 1 percent by weight is drawn from an outside source through line 11, controlled by valve 12, and forced by means of pump 13 into a primary dehydrating zone. The primary dehydrating zone may consist of a fractionator 14 equipped with means to supply heat thereto such as, for example, a reboiler, or a closed heating coil 15 positioned in the lower part of the column. Prior to its passage into fractionator 14 the wet acetone flowing through line 11 may be preheated by suitable means not shown in the drawings. Operation of fractionator 14 is controlled to separate a vapor fraction comprising acetone containing less than 1% by weight of water, for example, about 0.6% by weight, from a liquid fraction consisting substantially of water. The liquid fraction is drawn from the lower part of fractionator 14 through line 16, controlled by valve 17, and eliminated from the system. The vapor fraction is passed from the upper part of fractionator 14 through line 18 into a second dehydrating zone. A part of the vapors passing through line 18 is passed through line 19, controlled by valve 20 into cooler 21 whence it passes through line 22 as reflux to the upper part of column 14. The second dehydrating zone may suitably consist of a fractionator 25.

If the charge to the system contains less than, for example, one per cent by weight of water it may be charged directly to fractionator 25 by means of line 26 controlled by valve 27. Such material may be charged to the system through line 26 in addition to the material of higher water content charged to fractionator 14 through line 11.

Within fractionator 25 the water content of the acetone is reduced to less than 0.01% by weight by the novel distillation method described above making use of an auxiliary reflux. In accordance therewith a suitable auxiliary reflux having the above-described characteristics is drawn from an outside source through line 29, controlled by valve 30, and introduced into the upper part of fractionator 25 in controlled amounts at a point not above that at which condensed reflux is introduced into fractionator 25 as reflux. The auxiliary reflux used may consist, for example, of a single hydrocarbon or a mixture of hydrocarbons. Hydrocarbons such as the lower paraffin hydrocarbons, for example, pentane, form ternary azeotropes with acetone and water and therefore are to be avoided. Preferred auxiliary reflux comprises paraffin hydrocarbons or mixtures consisting substantially of paraffinic hydrocarbons boiling above, for example, about 100° C. such as a kerosene fraction having an approximate boiling range of from about 115° C. to 145° C. at 60 mm. pressure. The kerosene is added to fractionator 25 in controlled quantities to maintain a concentration throughout the column of more than about 35%, preferably about 70%, by weight of the acetone-water mixture present in the column. If desired the kerosene may be preheated to a temperature of, for example, from about 62° C. to about 67° C. By proper control of these conditions within fractionator 25 there is obtained with a comparatively small column an overhead product rich in water and a bottom product of dry acetone and kerosene. Overhead vapors from fractionator 25 are drawn therefrom through line 32, controlled by valve 33 and will have, for example, the following approximate composition:

| | Percent by weight |
|---|---|
| Acetone | 93.9 |
| Water | 5.7 |
| Kerosene | Less than 0.4 |

The acetone taken overhead from fractionator 25 will generally not exceed about 9.7% of the total acetone charged. The exceedingly small kerosene content amounting to only about 0.05% of the total column feed, permits recycling of the vapors through line 32 and line 11 into fractionator 14 to recover the acetone therein. A part of the vapors passing through line 32 are by-passed through line 34, controlled by valve 35, and passed into condenser 36 wherein they are condensed. From condenser 36 liquid is passed through line 37 and line 39, controlled by valve 40, into fractionator 25 as reflux. Condensate withdrawn from condenser 36 exceeding that required for reflux may be drawn from the system through line 37 by judicious manipulation of valve 38.

Liquid bottoms having, for example, the following approximate composition:

| | Percent by weight |
|---|---|
| Acetone | 30 |
| Kerosene | 70 | is drawn from the lower part of fractionator 25 through line 42 and forced therethrough by means of pump 41 into fractionator 43. The water content of the acetone drawn from fractionator 25 through line 42 will generally not exceed 0.01% by weight on a kerosene-free basis.

Within fractionator 43 separation of a vapor fraction consisting of anhydrous acetone from a liquid fraction consisting of kerosene is effected. Anhydrous acetone vapors leave the upper part of fractionator 43 through line 44 and pass into condenser 45 wherein they are condensed. From condenser 45, condensed acetone is passed into accumulator 47. From accumulator 47 anhydrous acetone having a water content below about 0.01% by weight is continuously drawn through line 50, controlled by valve 51, as the final product. A part of the actone is drawn from line 50 and forced by means of pump 52, through line 53, into the upper part of fractionator 43 as reflux.

Fractionator 43 is provided with suitable heating means such as, for example, a reboiler or a closed heating coil 54. Kerosene is drawn from the bottom of fractionator 43 through line 56 controlled by valve 57. In a preferred manner of operation a part or all of the kerosene drawn through line 56 is forced through line 58 by means of pump 59, and into line 29 discharging into fractionator 25. A cooler 60 is positioned in line 58 to cool kerosene recycled through line 58. If desired, the kerosene recycled through line 58 may also be subjected to indirect heat exchange with bottoms from fractionator 25 flowing through line 42, by means not shown in the drawings.

Selection of a suitable auxiliary reflux is guided to a substantial degree by the ease with which it can be separated from the product. Thus the auxiliary reflux used in the dehydration of acetone should preferably have a boiling range above about 100° C. The vapor-liquid equilibrium curve, for acetone-kerosene mixtures, curve D in Fig. IV, shows the extreme ease with which these components may be separated. It has been found that specification acetone overhead product and bottoms with more than 99.5 per cent kerosene may be obtained when utilizing as fractionator 43 a column of only about five theoretical plates and operating with a reflux ratio of only one-half.

It is to be noted that in the process of the invention minimum amounts of auxiliary reflux are vaporized within the system and substantially no condensing of auxiliary reflux is required. The process of the invention therefore presents a method for the production of anhydrous acetone exceeding by far in efficiency and economy the methods disclosed heretofore.

The process of the invention is effected at atmospheric pressure or pressures slightly above atmospheric. The use of higher pressures is, however, not excluded from the scope of the invention and will be determined by the nature of the components to be separated and of the auxiliary reflux used.

Operating data for the production of anhydrous acetone in accordance with the process of the invention are given in the following example to more fully illustrate the invention.

*Example*

The apparatus used is that shown in Fig. III of the drawings and parts thereof will be referred to by their respective reference numbers shown in the drawings.

Water-containing acetone is charged to the first dehydrating column 14, wherein the water content of the acetone is reduced to 0.60% by weight. The acetone of reduced water content is taken overhead from column 14 and charged to the second dehydrating column 25.

Column 25.—Theoretical plates=10; reflux ratio=10. Ratio secondary reflux/ordinary reflux=2.1. Feed (overhead from column 14)= 0.6% water.

Column 43.—Theoretical plates=5; reflux ratio =0.5.

Auxiliary reflux.—Kerosene B. P. 115–145° C. at 60 mm. charged to column 25 at such rate as to maintain approximately 70 per cent kerosene throughout the column.

Basis.—The following figures are based on a charge of 1006 lbs. of column 14 overhead to column 25:

| | Weight | Per cent by weight | | |
|---|---|---|---|---|
| | | Acetone | Water | Kerosene |
| Column 25: | *Pounds* | | | |
| Feed | 1,006 | 99.4 | 0.60 | |
| Auxiliary reflux (kerosene) | 2,100 | | | 100 |
| Overhead (recycled to column 14) | 103 | 93.92 | 5.73 | 0.35 |
| Bottoms | 3,003.0 | 30.0 | 0.003 | 70.0 |
| Column 43: | | | | |
| Feed (bottoms from column 25) | 3,003.0 | 30.0 | 0.003 | 70.0 |
| Overhead | 893.0 | 99.98+ | 0.01 | Trace |
| Bottoms | 2,110.0 | 0.50 | 0.0 | 99.5 |

Pounds auxiliary reflux (kerosene) circulated from column 43 to column 25 per lb. of dry acetone product=2.35.
Pounds auxiliary reflux lost per 1,000 lbs. of acetone=0.4.
Acetone recycled from column 25 to column 14=9.75% of total acetone charged to system.

From the above data it is seen that the production of 1000 lbs. of acetone having a water content of 0.01 per cent by weight from acetone containing 0.6 per cent by weight by the process in accordance with the invention requires the vaporization of a total of 3730 lbs. of material. Calculations from liquid-vapor equilibrium data for acetone and water show that separation of acetone having a water content of 0.6 per cent by weight into fractions containing 0.1 and 2.4% by weight of water respectively with a recovery of only 75% by weight of the acetone fraction having a water content of 0.1% by weight would require a column of 23 ideal plates and a reflux ratio of 10. Production of 1000 lbs. of acetone having a water content of 0.1 per cent by weight would therefore require the vaporization of 13,750 lbs. of material. Dehydration of acetone from 0.5 per cent to 0.01 per cent water by the process of the invention requires the consumption of only 30 per cent of the heat consumption required to obtain a final product containing 0.1 per cent water by ordinary distillation. The extreme efficiency and economy of the process of the invention are made apparent by these figures.

Although the invention has been described in detail in its applicability to the dehydration of acetone, it is to be understood that it is not limited in scope to this example given solely for the purpose of setting forth more clearly the nature of the invention. A great number of oxygen-containing organic liquids may be dehydrated by the method of the invention. Thus the process may be applied to the separation of water from its admixture with dioxane, using as auxiliary reflux the materials mentioned above as suitable auxiliary reflux in the dehydration of acetone. Water may be separated from admixture with isopropyl alcohol by the process of the invention using brombenzene as the auxiliary reflux. The invention is, furthermore, not limited in its application to dehydration operations and may be applied to the separation of liquid components other than water from solutions or liquid mixtures.

In applying the process of the invention to the separation of at least one component from a mixture predominating in two components A and B, the auxiliary reflux to be used will be selected from materials having the following characteristics:

1. Greater solubility for A than for B,
2. A boiling point, or initial boiling point, above that of A,
3. Will not form binary azeotropes with A,
4. Will not form ternary azeotropes with A and B.

The separation of components forming azeotropic mixtures under ordinary distillation conditions is not excluded from the scope of the invention. The presence throughout the distillation zone of a suitable auxiliary reflux has been found to cause a change in the composition of the azeotrope so that it will contain a far larger proportion of one component than the natural azeotrope or will cause the azeotrope to disappear entirely. The process of the invention may be applied for example to the substantially complete dehydration of dioxane. Dioxane is an extremely effective agent for the azeotropic dehydration of acetic acid. Its use is restricted, however, by the fact that since the dioxane and water azeotrope does not stratify, a method such as "salting" or ternary azeotropic distillation had to be resorted to heretofore to dehydrate the dioxane for reuse. In accordance with the process of the invention water-containing dioxane is dehydrated by distillation in the presence of a suitable auxiliary reflux, such as, for example, a substantially paraffinic hydrocarbon mixture having a boiling range above the boiling point of dioxane.

In a preferred method of carrying out the dehydration of dioxane, the water-containing dioxane is fractionated in the primary fractionating zone to separate a vapor fraction consisting of the dioxane azeotrope comprising 18.8 per cent water. This azeotrope is then fractionated in the second fractionating zone while maintaining a suitable auxiliary reflux material such as, for example, a kerosene fraction throughout the second fractionating zone. It has been found possible to separate a vapor fraction comprising 33.0 per cent water from a liquid fraction consisting of substantially anhydrous dioxane and kerosene in the second fractionating zone. Overhead from the second fractionating zone is returned in part or entirely to the first fractionating zone. Substantially anhydrous dioxane is separated from the liquid fraction separated in the second fractionating zone. The process of the invention thus provides a more efficient method for the dehydration of water-containing dioxane than has been available heretofore.

The process of the invention is broadly applicable to the separation of any solutions or liquid mixtures of substances which are separated with difficulty or which are not at all separable by ordinary distillation means and which may be separated by fractionation in the presence of a third substance having the described suitable characteristics. The process of the invention is not limited in its application to the separation of binary mixtures. For example, di-isopropyl ether containing acetone and water admixed therewith may easily be separated maintaining a kerosene auxiliary reflux throughout the distillation zone. The auxiliary reflux having a greater solvent power for the di-isopropyl ether, an overhead rich in acetone and water will be obtained from the top of the column and di-isopropyl ether and auxiliary reflux will be drawn from the bottom of the column. The acetone-water overhead may then be separated by the method of the invention as described above.

It is to be understood that many modifications of the invention may be made without departing from the scope thereof and that it is not intended to limit the invention to any specific illustrative examples of the specification nor is it to be limited by the accuracy of any operating data or theories set forth herein for the sole purpose of more clearly setting forth the invention. The invention is intended to be limited only by the scope of the following claims wherein it is intended to claim broadly all novelty of the invention over the prior art.

We claim as our invention:

1. Process for dehydrating water-containing acetone comprising fractionating water-containing acetone in a first fractionating zone, separating a vapor fraction comprising acetone containing water in a quantity less than about 1 per cent by weight from a liquid fraction predominating in water in the first fractionating zone, passing at least a part of the vapor fraction from the first fractionating zone into a second fractionating zone, introducing a kerosene fraction in the liquid phase into the upper part of the second fractionating zone, maintaining said kerosene substantially in the liquid phase and at a concentration of from about 35 per cent to 75 per cent by weight throughout the second fractionating zone, separating a water-containing vapor fraction substantially free of kerosene from a liquid fraction comprising anhydrous acetone and kerosene in the second fractionating zone, passing at least a part of the vapor fraction from the second to the first fractionating zone, passing the liquid fraction from the second to a third fractionating zone, separating anhydrous acetone from kerosene in the third fractionating zone, recycling at least a part of the separated kerosene from the third fractionating zone to the second fractionating zone, and withdrawing anhydrous acetone as a final product from the third fractionating zone.

2. Process for dehydrating water-containing acetone comprising fractionating water-containing acetone in a first fractionating zone, separating a vapor fraction comprising acetone containing water in a quantity less than about 5 per cent to 6 per cent by weight from a liquid fraction predominating in water in the first fractionating zone, passing at least a part of the vapor fraction from the first fractionating zone into a second fractionating zone, introducing a kerosene fraction in the liquid phase into the upper part of the second fractionating zone, maintaining said kerosene substantially in the liquid phase and at a sufficiently high concentration in the range of from 35 per cent to 75 per cent by weight throughout the second fractionating zone to obtain a ratio of water to acetone in the equilibrium vapor greater than the ratio of water to acetone in the liquid in contact therewith, separating a water-containing vapor fraction substantially free of kerosene from a liquid fraction comprising anhydrous acetone and kerosene in the second fractionating zone, passing at least a part of the vapor fraction from the second to the first fractionating zone, passing the liquid fraction from the second to a third fractionating zone, separating a vapor fraction comprising anhydrous acetone from a liquid fraction comprising kerosene in the third fractionating zone, recycling at least a part of the liquid fraction from the third fractionating zone to the second fractionating zone, and withdrawing anhydrous acetone as a final product from the third fractionating zone.

3. Process for dehydrating water-containing acetone comprising fractionating water-containing acetone in a first fractionating zone, separating a vapor fraction comprising acetone containing water in a quantity less than about 10 per cent by weight from a liquid fraction predominating in water in the first fractionating zone, passing at least a part of the vapor fraction from the first to a second fractionating zone, introducing toluene in the liquid phase into the upper part of the second fractionating zone, maintaining said toluene substantially in the liquid phase and at a sufficiently high concentration in the range of about 35 per cent to 75 per cent by weight throughout the second fractionating zone to obtain a ratio of water to acetone in the equilibrium vapor greater than the ratio of water to acetone in the liquid fraction in contact therewith, separating a water-containing vapor fraction substantially free of toluene from a liquid fraction comprising anhydrous acetone and toluene in the second fractionating zone, passing the liquid fraction from the second fractionating zone to a third fractionating zone, separating a vapor fraction comprising anhydrous acetone from a liquid fraction comprising toluene in the third fractionating zone, recycling at least a part of the liquid fraction from the third fractionating zone to the second fractionating zone, and withdrawing the vapor fraction comprising anhydrous acetone as a final product from the third fractionating zone.

4. Process for dehydrating water-containing acetone comprising fractionating water-containing acetone in a first fractionating zone, separating a vapor fraction comprising acetone containing only a minor percentage of water from a liquid fraction predominating in water in the first fractionating zone, passing at least a part of the vapor fraction from the first fractionating zone to a second fractionating zone, introducing a mixture of normally liquid substantially paraffinic hydrocarbons in the liquid phase having a minimum boiling point above about 100° C. into the upper part of the second fractionating zone, maintaining said hydrocarbon substantially in the liquid phase and at a sufficiently high concentration in the range of from about 35 per cent to about 75 per cent by weight throughout the second fractionating zone to obtain a ratio of water to acetone in the equilibrium vapor greater than the ratio of water to acetone in the liquid in contact therewith, separating a water-containing vapor fraction substantially free of hydrocarbons from a liquid fraction comprising anhydrous acetone and hydrocarbons in the second fractionating zone, passing the liquid fraction from the second fractionating zone to a third fractionating zone, separating a vapor fraction comprising anhydrous acetone from a liquid fraction comprising hydrocarbons in the third fractionating zone, recycling at least a part of the liquid fraction from the third fractionating zone to the second fractionating zone, and withdrawing the vapor fraction comprising anhydrous acetone as a final product from the third fractionating zone.

5. Process for dehydrating water-containing acetone comprising fractionating water-containing acetone in a first fractionating zone, separating a vapor fraction comprising acetone containing only a minor percentage of water from a liquid fraction predominating in water in the first fractionating zone, passing at least a part of the vapor fraction from the first fractionating zone to a second fractionating zone, introducing a normally liquid substantially aromatic hydrocarbon material in the liquid phase having a boiling point about 100° C. into the upper part of the second fractionating zone, maintaining said hydrocarbon substantially in the liquid phase and at a sufficiently high concentration in the range of from about 35 per cent to 75 per cent by weight throughout the second fractionating zone to obtain a ratio of water to acetone in the equilibrium vapor greater than the ratio of water to acetone in the liquid in contact therewith, separating a water-containing vapor fraction substantially free of hydrocarbons from a liquid fraction comprising anhydrous acetone and hydrocarbons in the second fractionating zone, passing at least a part of the vapor fraction from the second to the first fractionating zone, passing the liquid fraction from the second fractionating zone to a third fractionating zone, separating a vapor fraction comprising anhydrous acetone from a liquid fraction comprising hydrocarbons in the third fractionating zone, recycling at least a part of the liquid fraction from the third fractionating zone to the second fractionating zone, and withdrawing anhydrous acetone as a final product from the third fractionating zone.

6. In a process for recovering anhydrous acetone from an acetone-water mixture containing water in an amount less than about 5 to 6 per cent by weight, the steps of introducing the acetone-water mixture into a fractionating zone wherein it is subjected to fractionating conditions, introducing a kerosene fraction in the liquid phase into the upper part of the fractionating zone, maintaining said kerosene substantially in the liquid phase and at a sufficiently high concentration in the range of from about 35 per cent to 75 per cent by weight throughout the second fractionating zone to obtain a ratio of water to acetone in the equilibrium vapor greater than the ratio of water to acetone in the liquid in contact therewith, withdrawing a water-containing vapor fraction substantially free of kerosene overhead from the fractionating zone, withdrawing a liquid fraction comprising anhydrous acetone and kerosene from the fractionating zone, and separately recovering anhydrous acetone from said liquid fraction.

7. In a process for recovering anhydrous acetone from an acetone-water mixture containing water in an amount less than about 5 to 6 per cent by weight, the steps of introducing the acetone-water mixture into a fractionating zone wherein it is subjected to fractionating conditions, introducing benzene in the liquid phase into the upper part of the fractionating zone, maintaining said benzene substantially in the liquid phase and at a sufficiently high concentration in the range of about 35 per cent to 75 per cent throughout the fractionating zone to obtain a ratio of water to acetone in the equilibrium vapor greater than the ratio of water to acetone in the liquid in contact therewith, withdrawing a water-containing vapor fraction substantially free of benzene overhead from the fractionating zone, withdrawing a liquid fraction comprising anhydrous acetone and benzene from the fractionating zone, and separately recovering anhydrous acetone from said liquid fraction.

8. In a process for recovering anhydrous acetone from an acetone-water mixture containing only a minor percentage of water, the steps of introducing the acetone-water mixture into a fractionating zone wherein it is subjected to fractionating conditions, introducing a normally liquid substantially paraffinic hydrocarbon material in the liquid phase boiling above about 65° C. into the upper part of the fractionating zone, maintaining said hydrocarbon in the liquid phase and at a sufficiently high concentration in excess of about 35 per cent by weight throughout the fractionating zone to obtain a ratio of water to acetone in the equilibrium vapor greater than the ratio of water to acetone in the liquid in contact therewith, withdrawing a water-containing vapor fraction substantially free of hydrocarbons overhead from the fractionating zone, withdrawing a liquid fraction comprising anhydrous acetone and hydrocarbons from the fractionating zone, and separately recovering anhydrous acetone from said liquid fraction.

9. In a process for recovering anhydrous acetone from an acetone-water mixture containing only a minor percentage of water the steps of introducing the acetone-water mixture into a fractionating zone wherein it is subjected to fractionating conditions, introducing a normally liquid hydrocarbon in the liquid phase having a boiling point above 100° C. into the upper part of the fractionating zone, maintaining said hydrocarbon substantially in the liquid phase and at a sufficiently high concentration in excess of about 35 per cent by weight throughout the fractionating zone to obtain a ratio of water to acetone in the equilibrium vapor greater than the ratio of water to acetone in the liquid in contact therewith, withdrawing a water-containing vapor fraction substantially free of hydrocarbons overhead from the fractionating zone, withdrawing a liquid fraction comprising anhydrous acetone and hydrocarbons from the fractionating zone, and separately recovering anhydrous acetone from said liquid fraction.

10. In a process for recovering anhydrous acetone from an acetone-water mixture containing only a minor percentage of water, the steps of introducing said acetone into a fractionating column wherein it is subjected to fractionating conditions, introducing into the upper part of the fractionating column a normally liquid organic compound in the liquid phase which has a greater solvent power for acetone than for water, which boils at a temperature above 65° C., which is incapable of forming a binary azeotrope with acetone and which is incapable of forming a ternary azeotrope with acetone and water at the operating conditions, maintaining said added organic compound substantially in the liquid phase throughout the fractionating column and coordinating the concentration of said organic compound therein with the water content of the acetone feed to the column so as to maintain a concentration in excess of about 35 per cent by weight at which the ratio of water to acetone in the equilibrium vapor is greater than the ratio of water to acetone in the liquid in contact therewith, withdrawing a water-containing vapor fraction overhead substantially free of said added organic liquid compound, withdrawing a liquid mixture of anhydrous acetone and said added organic compound as bottom product from said column and separately recovering anhydrous acetone from said liquid mixture.

CLARENCE L. DUNN.
GINO PIEROTTI.